United States Patent

Klatt et al.

Patent Number: 5,829,412
Date of Patent: Nov. 3, 1998

[54] SYSTEM FOR CONTROLLING AN INTERNAL COMBUSTION ENGINE

[75] Inventors: Roland Klatt, Untergruppenbach; Klaus Sassen, Markgröningen; Jörn Beckmann, Hemmingen; Bernd Mössner, Schwäbisch Gmünd; Bernd Haussmann, Sachsenheim, all of Germany

[73] Assignee: Robert Bosch GmbH, Stuttgart, Germany

[21] Appl. No.: 693,059

[22] PCT Filed: Nov. 27, 1995

[86] PCT No.: PCT/DE95/01669

§ 371 Date: Nov. 12, 1996

§ 102(e) Date: Nov. 12, 1996

[87] PCT Pub. No.: WO96/18812

PCT Pub. Date: Jun. 20, 1996

[30] Foreign Application Priority Data

Dec. 15, 1994 [DE] Germany .................. 44 44 751.5

[51] Int. Cl.$^6$ ................................. F02M 37/04
[52] U.S. Cl. ............................ 123/500; 123/479
[58] Field of Search .................... 123/479, 500, 123/501, 494, 357

[56] References Cited

U.S. PATENT DOCUMENTS

| | | | |
|---|---|---|---|
| 4,638,782 | 1/1987 | Yasuhara | 123/479 |
| 4,664,082 | 5/1987 | Suzuki | 123/479 |
| 4,797,828 | 1/1989 | Suzuki | 123/479 |
| 4,825,691 | 5/1989 | Sekiguchi | 123/479 |
| 4,884,549 | 12/1989 | Kelly | 123/500 |
| 5,188,081 | 2/1993 | Birk | 123/479 |
| 5,195,492 | 3/1993 | Gronenberg | 123/500 |
| 5,209,202 | 5/1993 | Maurer | 123/479 |
| 5,267,546 | 12/1993 | Siebert | 123/500 |
| 5,345,915 | 9/1994 | Schmitz-Heubsch | 123/479 |
| 5,575,258 | 11/1996 | Iochi | 123/479 |

*Primary Examiner*—Carl S. Miller
*Attorney, Agent, or Firm*—Kenyon & Kenyon

[57] ABSTRACT

A system is described for the control of an internal combustion engine, in particular a diesel gasoline engine, in the case of which at least one solenoid valve determines the beginning and the end of the fuel metering. First device (130) evaluate the signals of at least one first sensor (110) which generates a plurality of increment pulses. Second device (140) evaluate the signals of at least one second sensor. The second device transmits an angle size to the first device at specifiable points of time. The first device releases a signal starting out from this angle size and the signals of the first sensor (110).

9 Claims, 7 Drawing Sheets

SYSTEM FOR CONTROLLING AN INTERNAL COMBUSTION ENGINE

FIELD OF THE INVENTION

The present invention relates to a system for controlling an internal combustion engine.

BACKGROUND INFORMATION

A conventional system for controlling an internal combustion engine is described in German Patent Application No. 41 08 639. This system is used, in particular, for controlling a diesel internal combustion engine. The beginning and the end of the fuel delivery can be determined using a solenoid valve. Using such conventional device and process, the quantity control is inaccurate.

The object of the present invention is to improve the accuracy of fuel delivery in a system for controlling an internal combustion engine.

SUMMARY OF THE INVENTION

The process and the device according to the present invention allow considerably more accurate fuel delivery.

DETAILED DESCRIPTION OF THE INVENTION

Figure 1:
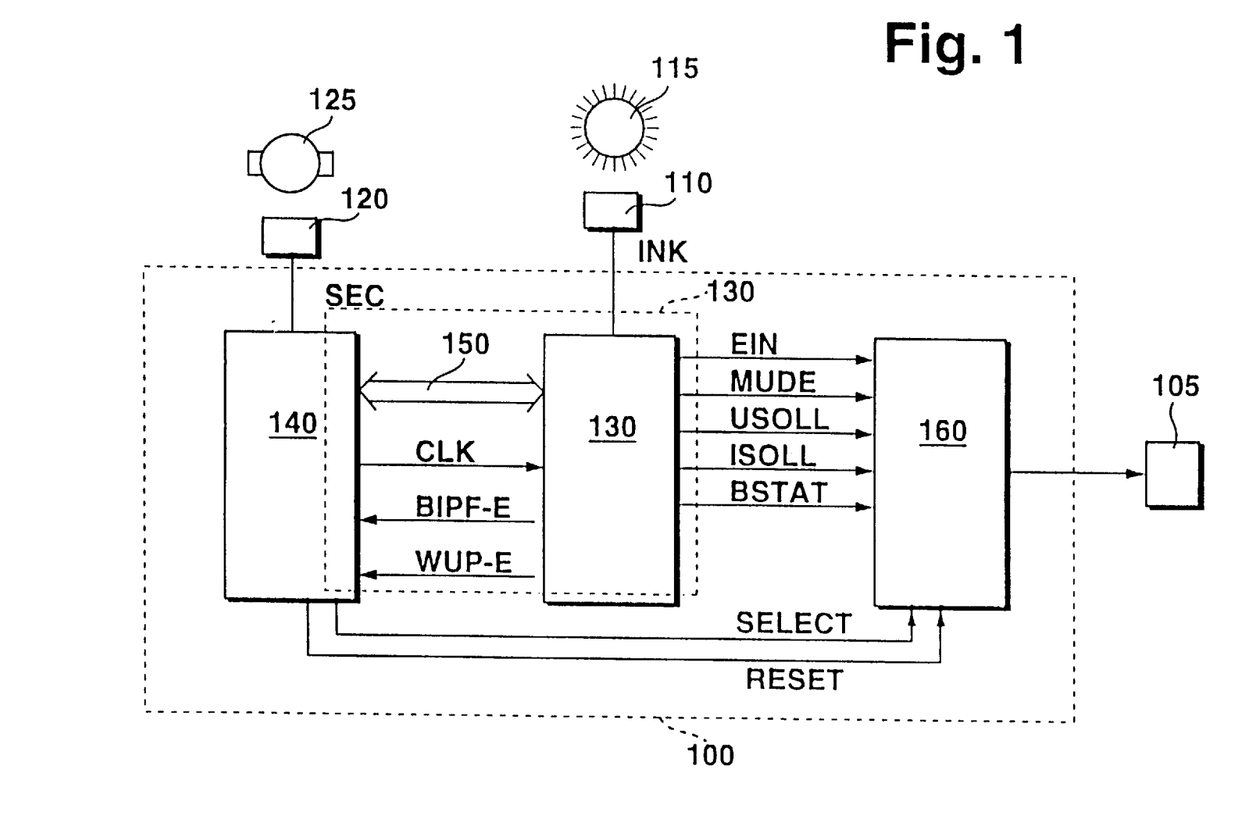
FIG. 1 shows a block diagram of the device according to the present invention.

FIG. 1 shows the device according to the present invention, illustrated as an example of the fuel delivery control of a diesel injection pump using at least one solenoid valve.

Control signals of a control unit 100 are supplied to a solenoid valve 105. The control unit processes the signals of a first sensor 110 and a second sensor 120. First sensor 110 scans the markings on an incremental timing wheel 115. The incremental timing wheel is preferably located on the crankshaft. The second sensor 120 scans the markings of a segment timing wheel 125, which is preferably located on the camshaft and supplies a signal SEG. The procedure according to the present invention is not limited to this timer arrangement; thus, either the incremental timing wheel or the segment timing wheel can be located on the camshaft and/or the crankshaft.

First sensor 110 supplies a signal INK. Each marking on incremental timing wheel 115 causes a positive and a negative edge of the INK signal to appear. The distance between two edges with the same sign in this embodiment according to the present invention, e.g., 6 crankshaft degrees. The increments appear with constant angular distance. Two edges with the same sign define an increment.

Furthermore, at least one reference mark is provided, which is defined through a gap, i.e., one or more markings on incremental timing wheel 115 and thus one or more edges of the INK signal are missing. Preferably two edges of the INK signal are missing. In the above-described embodiment of the present invention, the increment wheel is installed on the crankshaft. There are e.g., 58 markings spaced 6 degrees apart. The number 58 is obtained by omitting two markings. The number of gaps corresponds to one-half of the number of cylinders in the internal combustion engine. The segment wheel preferably installed on the camshaft preferably includes a number of markings corresponding to the number of cylinders. A double marking assigns the crankshaft angle to cylinder 1.

Control unit 110 includes a gate array 130, a controller 140, as well as an output element control 160, as well as an output element (not illustrated). Controller 140 and gate array 130 are connected to one another with various conductors and bus 150, and exchange different signals with one another through these conductors and bus 150. Gate array 130 and output element 160 are also connected to one another via various conductors. Furthermore, the controller 140 is connected to output element 160 preferably via two conductors. Output element 160 supplies current to solenoid valve 105.

The arrangement is configured so that the first sensor 110, which scans increment timer wheel 115, is only connected to gate array 130 and the second sensor 120, which scans segment wheel 125, is connected to controller 140. Such a configuration is advantageous since the increment signal is processed exclusively by gate array 130. Therefore controller 140 is not affected by high-frequency increment interrupts caused by the edges of the INK signal.

The INK signal of first sensor 110 provides the control unit with the current crankshaft angle information by counting down the increment edges. The duration of the current increment period is measured by a timer in the gate array, which writes the instantaneous timer status into a register with each positive edge of the INK signal, and is then reset. Controller 140 can read the value of this register, corresponding to the instantaneous speed of the crankshaft, from the gate array 130 via the bus 150 and obtain the instantaneous speed therefrom.

Parts of controller 140 and the gate array 130, which form a common function block, are marked with a dotted line and are denoted as IWZ. This is called an incremental angle-time system.

Figure 2A:
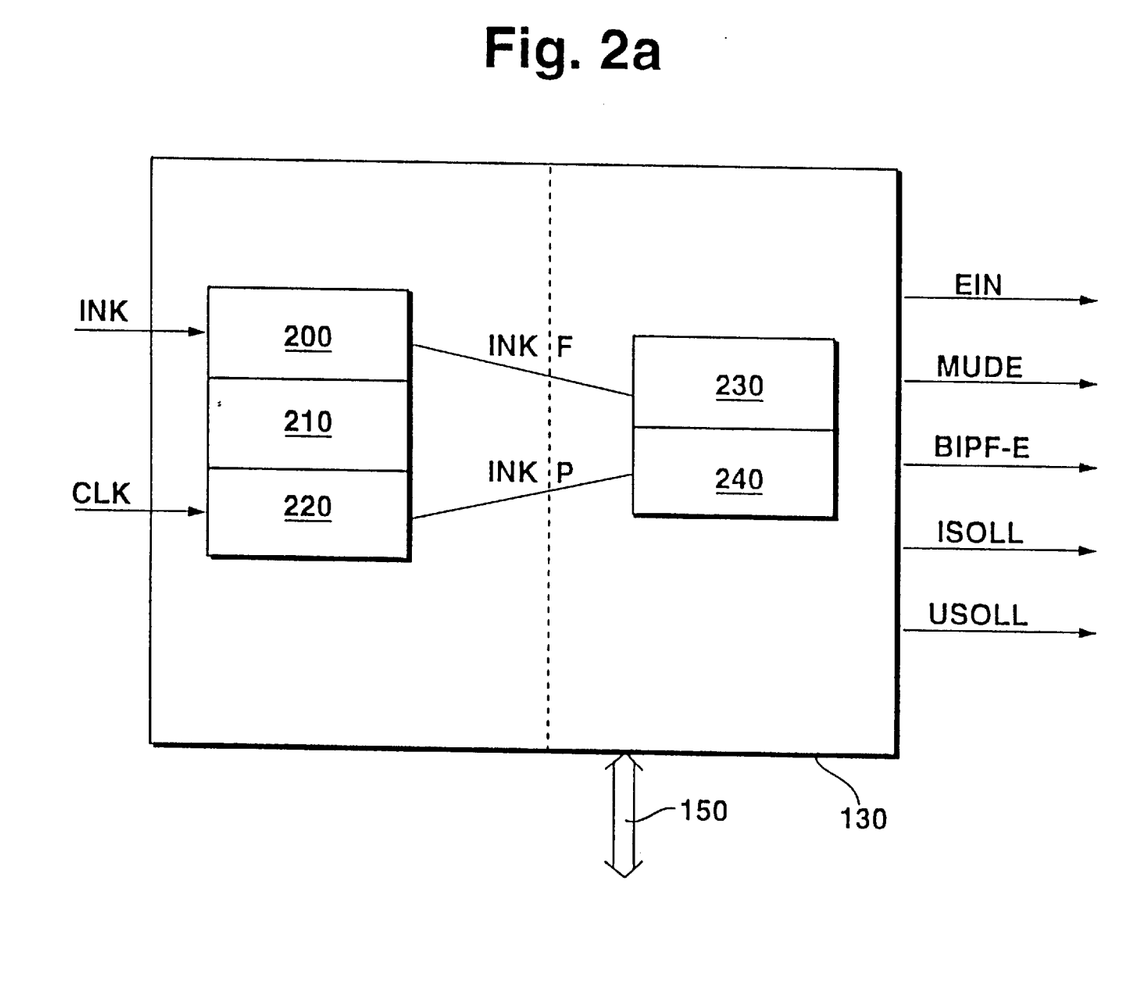
FIG. 2a shows a first exemplary embodiment as a block diagram of the exemplary elements of the device according to the present invention.

FIG. 2a shows exemplary elements of gate array 130 in more detail. The gate array 130 basically includes the function blocks illustrated in FIG. 2. The left half of the function blocks can be referred to as signal processing. It preferably receives the INK signal of the first sensor 110 and the CLK signal in fixed time increments.

Signal processing includes a dynamic plausibility check 200, a frequency multiplier 210 and a logical plausibility check 220. These blocks generate an INKF signal and an INKP signal, which are processed by the sequence control unit, consisting of angle timer 230 and sequence controller 240.

The sequence control unit provides the signals EIN, MODE, BIPF-E, ISOLL, and USOLL.

The tasks are divided between controller 140 and gate array 130 as follows. Controller 140 initializes gate array 130. Then controller 140 processes the SEG output signals of second sensor 120, which scans segment timer wheel 125. Based on other sensor signals (not illustrated), controller 140 generates set values for delivery start FB and delivery end FE as angle values for main injection and possibly for pre-injection, into each cylinder.

For every delivery to a cylinder, several time segments are distinguished: a pickup current phase, a voltage regulation phase, which can also be implemented as a free-wheeling phase and is also called BIP window, a holding current phase, and a quick clear phase. Controller 140 provides the durations $t_{az}$, $t_{BIP}$, and $t_{LS}$ of the individual time segments. Controller 140 also determines the BIP. Synchronization is also performed by controller 140. The above signals are preferably transferred via bus 150 to gate array 130.

Furthermore, a fixed-frequency CLK signal, preferably generated by a quartz crystal, is transferred from controller 140 to gate array 130. A SELECT signal is sent from controller 140 to output element 160. This signal preferably contains a 3-bits of information and selects one of the eight possible solenoid valves 105. This signal establishes the correspondence between the control signal and the respective cylinder. Furthermore, a reset signal can be sent from the controller to output element control 160.

Gate array 130 performs the following tasks. Gate array 130 checks the INK signal for plausibility. Furthermore, the angular resolution is increased through a process called pulse multiplication. Thus, the distance between two increments is divided into a plurality of partial pulses. Furthermore gate array 130 includes a device called an angle clock. The gate array 130 controls the injection sequences and stops injection when synchronization is lost.

For this purpose, gate array 130 sends different signals to output element 160 and controller 140.

The level of an EIN signal and a MODE signal determine the status of the solenoid valve. These signals are emitted by angle clock 230 and sequence controller 240.

The ISOLL signal is an analog set value for regulating the solenoid valve current, implemented in output element 160. This value is generated by a DA-converter. Two set values are required, one for holding current regulation and one for pickup current regulation. A logic circuit toggles between these two values during the BIP window. The set values are input in the corresponding gate array registers when the system is initialized.

The USOLL signal is a set value for the solenoid valve voltage regulation during the BIP window. It is also generated using a DA converter. The value of USOLL, which corresponds to the value of the voltage drop across the solenoid valve, is also input in a gate array register when the system is initialized. For a set value of zero, the BIP search is performed in the free-wheeling mode.

The BSTAT signal is a status signal for output element 160. This signal distinguishes between a BIP determination in the free-wheeling mode and a voltage regulation through the value that was input for obtaining the value of USOLL when the gate array was initialized. If this value is equal to zero, BIP determination is switched to the free-wheeling mode during the BIP window. If the BSTAT signal is not equal to zero, the solenoid valve voltage is regulated during the BIP window to the USOLL value that was input.

The BIPF-E signal generates an interrupt at controller 140 after the beginning of the BIP window or after the end of the pickup current regulation with the positive edge of the signal. This triggers an interrupt routine, which contains an AD converter routine for scanning the variation in the solenoid valve current during the BIP window. The time BIP of switching the solenoid valve is determined on the basis of the variation in the current. At the end of the BIP window, the same interrupt that ends the conversion is generated again through the falling edge of the signal. At the beginning of the injection, the rising edge is enabled. This means that only a rising edge triggers an interrupt. During the AD converter routine the falling edge is enabled. Thus the controller can recognize which edge has triggered an interrupt routine.

Figure 2B:
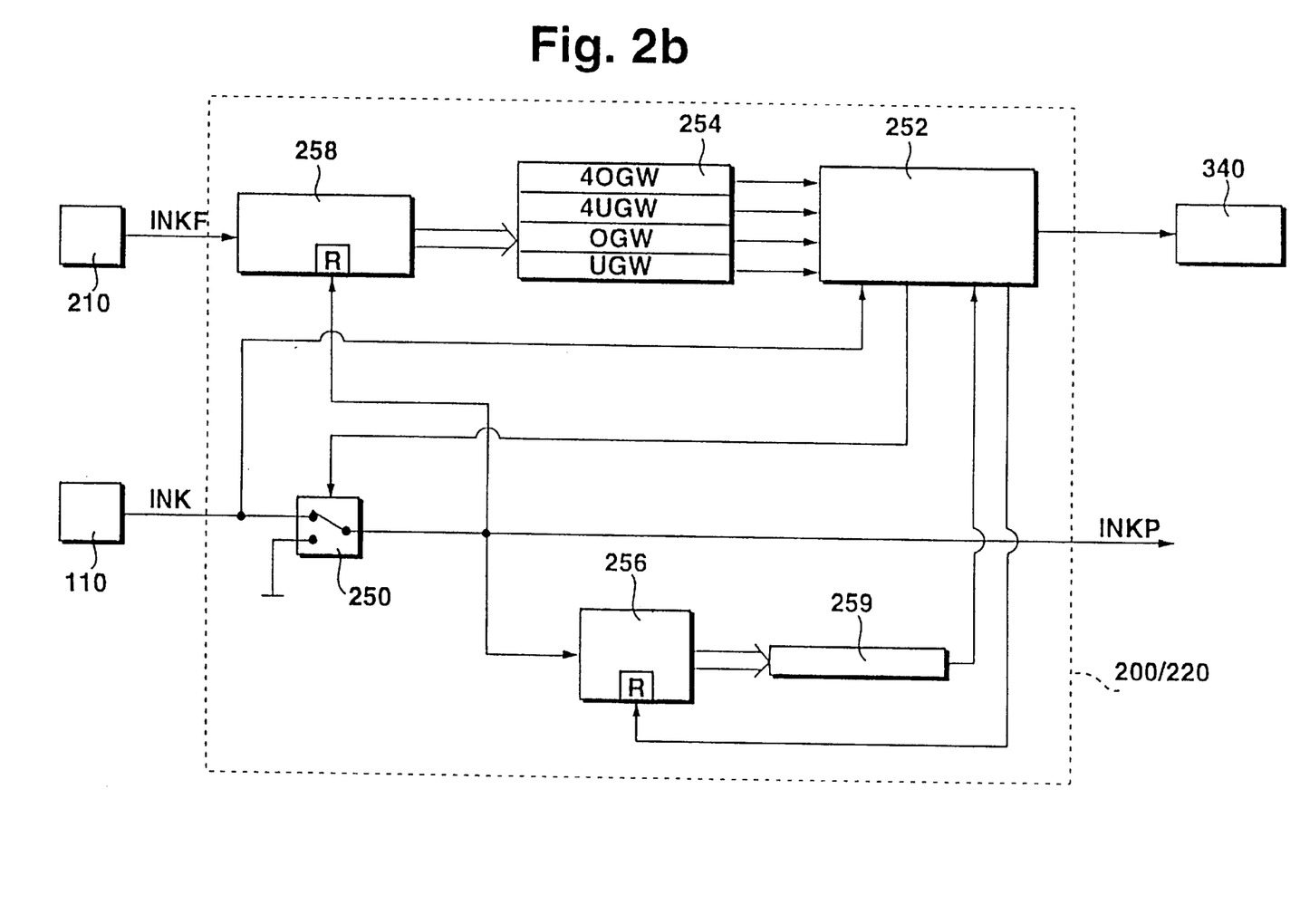
FIG. 2b shows a second exemplary embodiment as a block diagram of the exemplary elements of the device according to the present invention.

FIG. 2b shows dynamic plausibility check 200 and logical plausibility 220 in more detail. The INK output signals of first sensor 110 go through a switching means 250 to the counter input of an eight-bit counter 256 and to the reset input of an eleven-bit counter 258. Furthermore, they form the INKP output signal of plausibility checks 200 and 220. The INK signal goes directly to a plausibility check 252, which supplies a value to the gate array status register 340.

The INKF output signal of frequency multiplier 210 is supplied to the counter input of the eleven-bit counter 258. The counter status of the eleven-bit counter 258 goes to compare registers 254, which supply signals to plausibility check 252. Plausibility check 252 supplies a control signal to switching means 250 and a reset signal to the reset input of eight-bit counter 256.

The device according to the present invention operates as follows:

The INK signal is classified as plausible and forwarded as an INKP signal only if it occurs at a certain distance from the preceding signal. This analysis is performed during a validity window. This validity window is implemented using a counter-compare structure 258 and 254, timed with the INKF signal. Frequency multiplier 210 generates 256 INKF pulses per increment, which can also be called partial increments. If the internal combustion engine runs at constant speed, the next increment signal INK will appear after 256 pulses of the INKF signal. Considering acceleration and deceleration, the next pulse can also appear after fewer or more than 256 pulses.

Depending on the maximum possible acceleration and deceleration values, an angle window, also called a validity (range) window, is opened, where a pulse of the INK signal is accepted as plausible. Signals between a lower threshold value UGW and an upper threshold value OGW are accepted as valid. The pulses of the INKF signal are counted with eleven-bit counter 258 and compared with UGW and OGW in compare register 254. If the counter status of eleven-bit counter 258 is smaller than the lower threshold value UGW or greater than the upper threshold value OGW, the plausibility check activates switching means 250 so that the INK signal is disabled. If the counter status of eleven-bit counter 258 is greater than the lower threshold value UGW and smaller than the upper threshold value OGW, plausibility check 252 activates switching means 250 so that the INK signal is forwarded as INKP.

Only if the counter status of eleven-bit counter assumes 258 values within the validity window defined by UGW and OGW, is switch 250 in the position illustrated. In this case the INK signals are accepted as plausible signals INKP. After a plausible signal INK is recognized, the switch of plausibility check 252 is set to its open position and counter 258 is reset to zero. At the same time eight-bit counter 256 is incremented by one.

If no valid INK signal between UGW and OGW appears within the validity window, this is displayed by a plausibility bit in gate array status register 340 and the appropriate measures are taken. This means that, for example, the injection is interrupted to avoid damage to the engine and high levels of pollutant emissions.

Logical plausibility check 220 decides on the plausible number of counted signals INKP between two gaps. The number is determined from gap to gap through the shape of the increment wheel. This number is stored in compare register 259. The INKP signals recognized as plausible go to the counter input of eight-bit counter 256. These signals arc counted with the eight-bit counter 256 of counter-compare structure 256, 259 of the logical plausibility check. The counter status of eight-bit counter 256 provides the number of detected INKP teeth. It is compared to the contents of compare register 259. In the compare register 259, there is a value, input during the initialization of the controller, which provides the number of INKP pulses between the gaps in the INK signal. If this number of pulses is recognized, a gap is expected next. In this case another validity window with the values of 40GW and 4UGW is used for dynamic plausibility.

The first pulse is expected here within the validity window for the pulse after the gap. If a pulse occurs within the validity window of the increments, a plausibility error results and injection is interrupted.

Based on the duration of the increment period of the last increment before the gap, the INKF signal continues during the gap and during the first increment after the gap. The first INK signal is blanked out to correct the timer signal after the gap. In the case of a two-pulse gap, the first INK signal processed will appear after the time of four increments. This is the second pulse of the INK signal after the gap. To check this pulse for plausibility, a second validity window with the size of four increment windows is used. This window is implemented using two compare registers 4UGW and 40GW. The threshold values are increased in correspondence with the four times longer time to the next pulse. If compare register 259 of plausibility check 252 recognizes a gap, plausibility check 252 switches between the pairs of values for the increment window (OGW, UGW) and the gap window (40GW, 4UGW).

Dynamic plausibility check 200 evaluates the time intervals between the INK signal pulses from the point of view of the engine's dynamics. The rotating mass of the engine only allows accelerations and decelerations up to a certain value. Therefore, the quotient of successive increment signal periods may not exceed or drop below certain values.

The INK signal pulses are classified as plausible only if they appear at certain intervals from the latest pulse. For this purpose, it is checked whether an INK signal pulse appears within a certain time period. If such a pulse does not appear, this is shown through a plausibility bit in a gate array status register 340. If this plausibility bit is set in the gate array status register 340, controller 140 recognizes the INK signal as a transient defect.

As a result, injection is automatically interrupted by the gate array in order to avoid damage to the engine and high pollutant emission levels.

A missing signal can be caused by a disconnected cable or a defective sensor. It can also be caused by the appearance of interference pulses. If such pulses appear in the validity window, this is not immediately recognized. If the frequency of the multiplied increment signals $INK_f$ is increased by these interference signals to the point where the next INK signal pulse does not fall in the next validity window, plausibility is violated in the next period. If the next pulse fits into the subsequent windows, counting continues until reaching the counter status where a gap is expected. Since the counter status of the logical plausibility check's counter indicates the appearance of a gap too early due to the additional pulse, the expected gap appears too late by the duration of one increment period, since a normal tooth follows. The pulse will fall in the increment validity window and will therefore violate plausibility, since no increment pulse should appear here in the event of a gap.

Logical plausibility check 220 checks whether the number of plausible INK pulses between two gaps corresponds to a certain fixed number. The INK signal pulses recognized as plausible are denoted as the INKP signal. This means that the INK signals of the first sensor (110) are recognized as allowable if the value of a counting means, which counts partial increments, is within a validity window.

Frequency multiplier 210 consists of a counter-divider structure. It is based on measuring the duration of the INK signal period. The time between two positive edges of the INK signal is measured by a counter. The positive edges of the INK or INKP signal are normally referred to as pulses. The negative edges can also be considered as pulses and analyzed accordingly. Based on this value, the next increment is divided into a predetermined number of partial increments with the same duration. For a constant engine speed, i.e., constant duration of the INK signal periods, 256 INKF signal pulses are obtained during an INK period at the output of the frequency multiplier.

The duration of the INKF signal period corresponds to 1/256 of the latest increment period measured. The duration of the INKF signal remains unchanged during the gap and the first increment after the gap; therefore the duration of its period is an average value obtained from the gap period and the first INK period after the gap.

Figure 3:
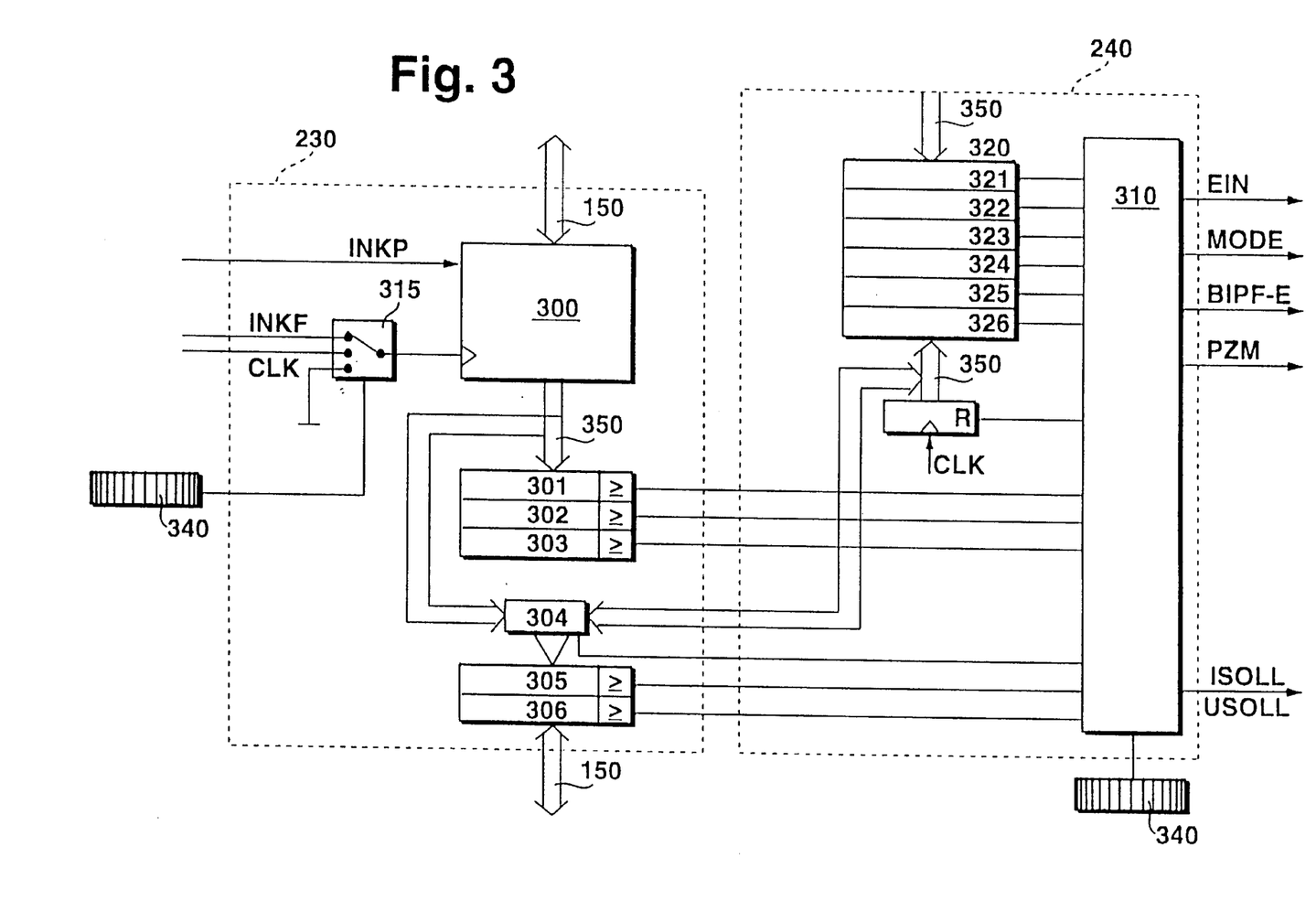
FIG. 3 shows an illustration of the exemplary elements according to the present invention.

FIG. 3 shows angle clock 230 and sequence control 240 in more detail.

The multiplied increment signal INKF goes to an angle counter 300 via a double-throw switch 315. Signal CLK is applied to the second input of double-throw switch 315. Double-throw switch 315 optionally supplies signal INKF or signal CLK to angle counter 300. Signal INKF goes to angle counter 300 as a second input value. Angle counter 300 is furthermore connected to bus 150.

Angle counter 300 is connected to different compare registers 301, 302, 303, 305, and 306 via a bus 350. The double-throw switch device 315 is activated by the output signal of a gate array control register. If the contents of the angle counter reach a value corresponding to the contents of any one of a compare register, the corresponding compare register emits a signal.

Sequence control 240 basically includes different compare registers 321, 322, 323, 324, 325, and 326. Furthermore, a time counter 330 is provided. Signal CLK is supplied to the time counter 330. The time counter is connected to registers 321 through 326 via bus 350. The output signals of compare registers 321 through 326, as well as compare registers 301, 302, 303, 305, and 306, as well as the output signal of time counter 330 and the output signal of block 304 are supplied to controller 310, which is also connected to gate array control register 340. Controller 310 emits signals EIN, MODE, BIPF-E, ISOLL, USOLL, and WUP-E.

Initiated by angle clock 230, sequence control 240 generates the sequence of control signals EIN, ISOLL, USOLL, and MODE for output element 160. Values of controller 140 are written into the individual registers 301, 302, 303, 305, and 306.

The value in compare register 301 provides the angular position of the crankshaft, at which the solenoid valve is energized to trigger pre-injection. The corresponding value for the main injection HE is stored in the second compare register 302. This angle value tells at which angular position of the crankshaft the solenoid valve should be energized.

Compare register 303 contains an angle position at which the angle clock emits an interrupt signal WUP-E in response to which controller 140 performs certain calculation steps.

Compare register 305 contains the angle position at which the activation of the solenoid for pre-injection should end. The corresponding value for the main injection is stored in compare register 306.

Compare registers 321 through 326 contain the times after which different signals are emitted.

Figure 4:
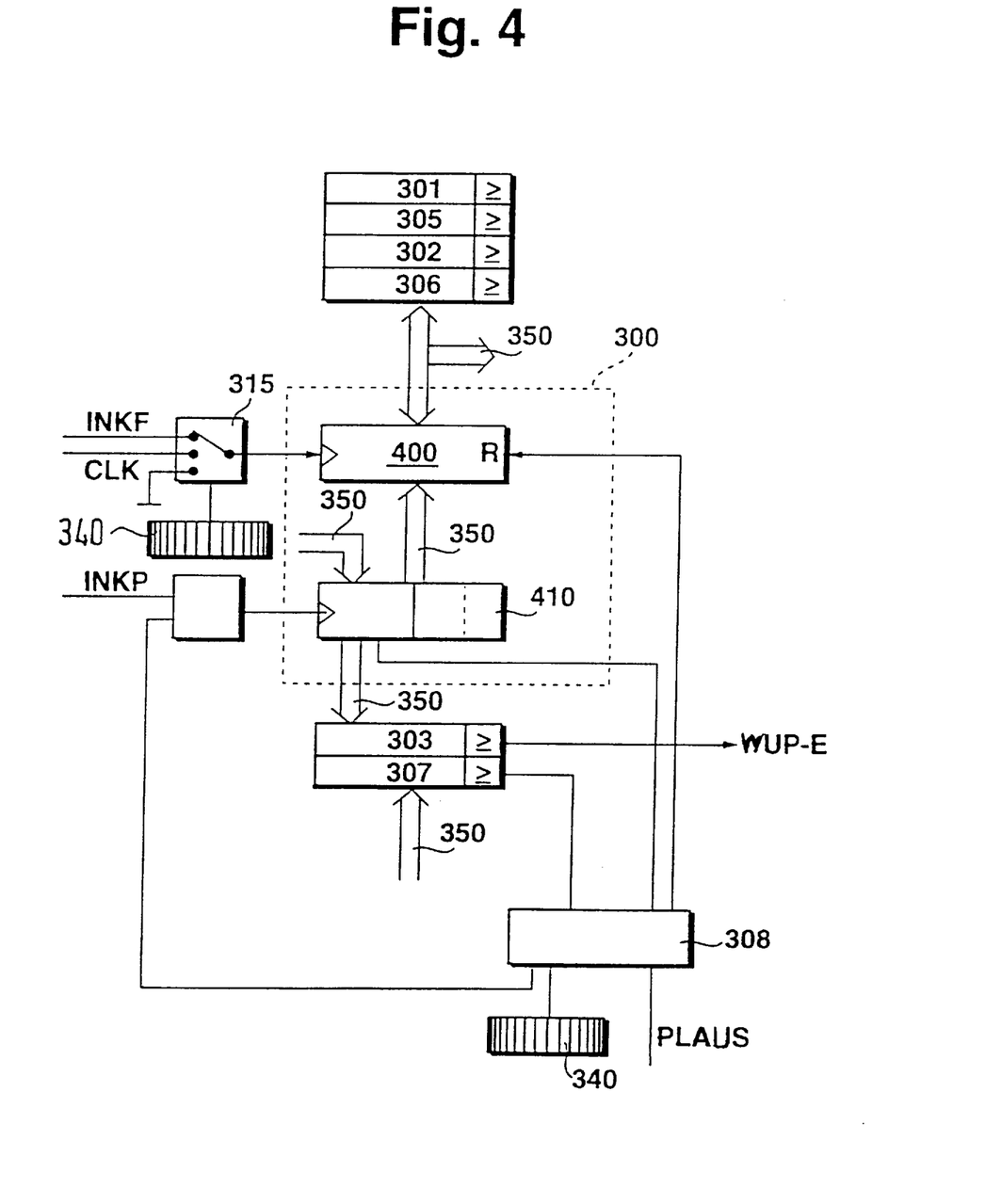
FIG. 4 shows a third embodiment of the device according to the, present invention.

FIG. 4 shows angle clock 230 in more detail. Angle counter 300 is shown in more detail. Angle counter 300 includes a 16-bit counter 400, supplied with the output signal of double-throw switch 315. The angle counter also includes another counter 410, which is supplied with the signal of an OR block 420. The INKP signal is applied to a first input of OR block 420. A second input of OR block 420 is connected to controller 308. Both counters are also connected to a controller 308. Counters 400 and 410 are connected to the different compare registers through a bus.

If control register 340 contains a value showing that the INK increment signals are not plausible or that some other error has occurred, double-throw switch 315 is activated so that the CLK signal is used instead of the INKF signal.

The first eight bits, also called the most significant byte, of the other counter 410 are incremented by 1 when an INKP signal appears. The second eight bits of the other counter 410 always assume the value zero. This means that the other counter 410 counts the INK increment pulses recognized as plausible. The missing pulses in the gap are replaced by controller 308. This means that the controller 308 provides pulses in the gap that correspond to the missing edges.

The contents of counter 400 are incremented for each pulse of the output signal of double-throw switch 315. This means that counter 400 counts the multiplied INKF increment pulses.

Every time the other counter 410 is incremented, the contents of the other counter 410 are written in counter 400.

Counter 400, which is preferably implemented as a 16-bit counter, is timed with the frequency of the multiplied INKF angle information. The status of counter 400 corresponds to the current crankshaft position. The first 8 bits of counter 400 or the other counter 410 provide the number of teeth, and the second 8 bits of counter 400 or counter 410 provide the number of partial INKF increments. The second 8 bits successively assume states from 0 to 256. The second 8 bits are reset to zero for each INKP increment recognized as plausible.

For constant speed and correct frequency multiplication, a multiple of 256 must be present in angle counter 400 for each increment edge. To counter the deviation of the angle clock from the crankshaft angle due to acceleration or deceleration, the status of the angle clock is corrected with the edges of the INKP signal. For this purpose, the contents of counter 410 are transferred to counter 400 for each edge of the INKP signal, whereby the second 8 bits of angle counter 400 are reset to zero.

Furthermore, angle (16-bit) counter 400 is reset to zero after 720 degrees crankshaft angle. Compare register 307 is used for this purpose. When the contents of the angle (16-bit) counter 400, in particular the first eight bits of counter 410, reach a value corresponding to the 720-degree angular position, angle (16-bit) counter 400 is reset to zero via controller 308.

In the event of an error, controller 308 switches between angle delivery, i.e., counting of the INKF increments, or time delivery, i.e., counting CLK signals. This is done by setting a bit of control register 340 to a certain value. Depending on this value, switching means 315 assumes a certain position. Furthermore, controller 308 generates wake-up interrupts.

According to the present invention, greater-or-equal compare registers are used. Since the timing of the angle clock is only adjusted after every six degrees of crankshaft angle on the basis of the latest increment period, the angle clock may be too slow in the case of acceleration or too fast in the case of deceleration. In the case of acceleration, the next tooth edge may have been reached prior to the angle clock assuming the corresponding status. Problems may arise when comparing for equality if the desired angle clock status is skipped due to the set value correction. For example, if acceleration occurs in the zero to 6 degrees increment, the value 250 is not reached if the acceleration is high, since the increment edge appears, for example, when the angle clock status has reached 240, and this value is corrected to 256. If the injection angle were 250, no signal would appear. This shortcoming can be avoided through the use of greater-equal compare registers.

The compare registers must be prevented from activating the solenoid valves more than once for the $MV_{on}$ and $MV_{off}$ angles. This could occur due to multiple passes through the angles that were input. For this purpose, the compare registers are designed as single-shot registers. The compare logic is activated in the case of an overwrite with the angles and loses its ability to generate signals after an event has been triggered. Thus it is ensured that no additional injection signals are generated for the corresponding crankshaft angle. After a reset and/or loss of synchronization, the compare logic is inactive.

The set angles $MV_{ON}$ and $MV_{OFF}$ for injection are input in compare registers 301, 302, 304, and 306 by controller 140. If the value in the compare register and that of counter 300 coincide, or if the counter status in angle counter 300 is already greater than that in the compare register, the corresponding compare register generates a signal for sequence controller 310.

Time counter 330 of sequence controller 240 is linked to the signals of angle counter 300 and its compare registers. Compare register signals of compare registers 301, 302, 305, and 306 start pre-injection and main injection.

When the angle stored in compare register 301 is reached, time counter 330 starts from zero and goes through the phases for pickup current regulation, BIP window, and holding current regulation. When the status stored in compare registers 305 or 306 is reached, time counter 330 is reset to zero and goes through the quick clear phase. After going through the quick clear phase, time counter 330 is held at zero.

Based on the output signals of the different compare registers in the angle clock and the sequence controller, the sequence controller generates a sequence of EIN and MODE signals. The levels of the EIN and MODE signals for generating the different solenoid valve states are encoded by the compare registers and a logic circuit connected downstream in controller 310.

Figure 5:
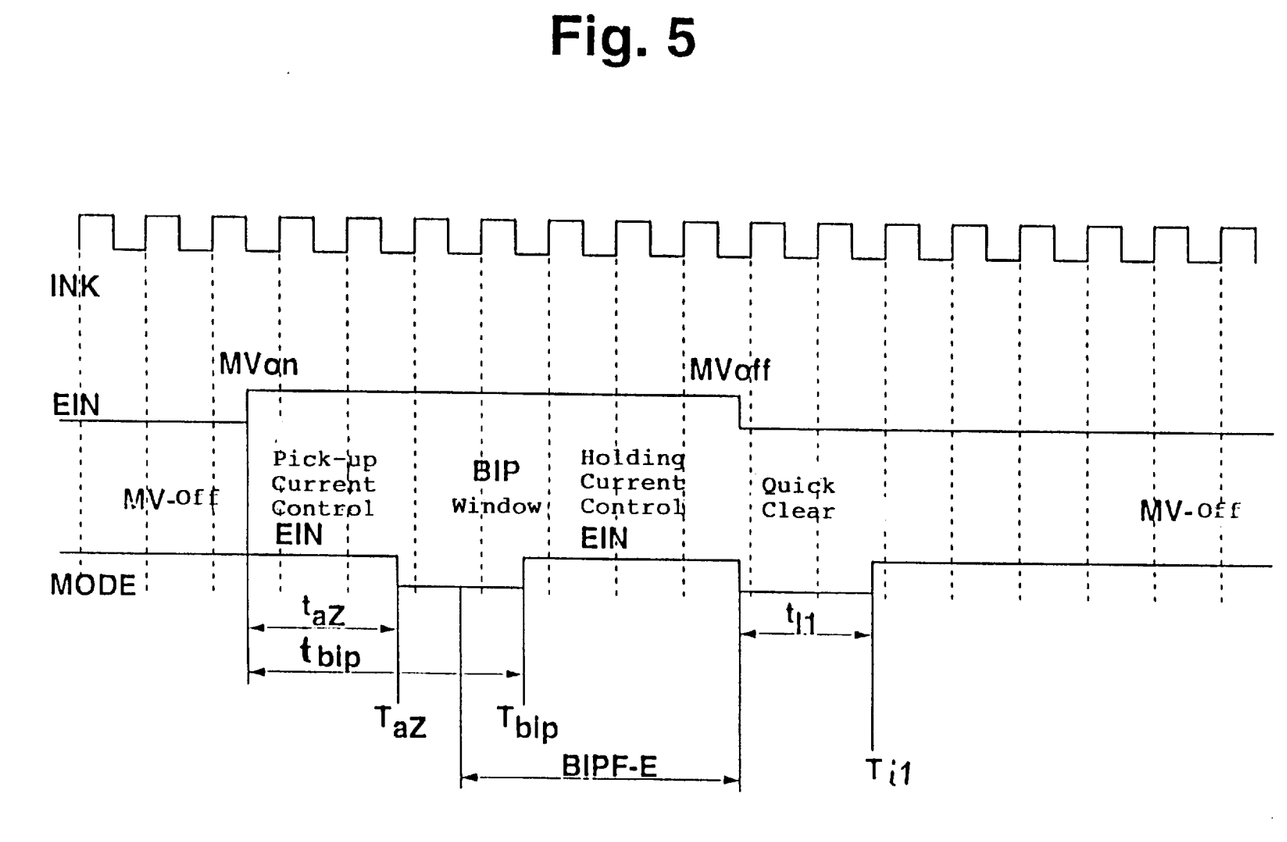
FIG. 5 shows an illustration of signals recorded over time according to the present invention.

FIG. 5 shows different signals plotted against time. In the first row, the different increments, the INK signal and the INKP signal appear. The increments are shown by vertical dotted lines.

In the second line the EIN signal is shown. This signal has a lower and a higher level. As long as this signal has a lower level, the solenoid valve is not energized. From the moment $MV_{on}$ signal is generated, the signal level increases and the solenoid valve is energized. When the $MV_{off}$ signal is generated, the valve is de-energized. The third line shows the MODE signal. This signal also has a lower and a higher level.

The angular position of the crankshaft in which the positive edge $MV_{on}$ of the EIN signal appears is stored in compare register 302 for the main injection and in compare register 301 for pre-injection. The angle value of the $MV_{off}$ signal is stored in compare register 305 for pre-injection and in compare register 306 for the main injection. As soon as the content of counter 300 exceeds the value stored in compare registers 301, 302, 305, and 306, the compare registers forward a signal to the controller 310. Controller 310 then outputs a corresponding EIN signal with the corresponding level.

The third row shows the MODE signal. This signal also assumes two values. Starting at moment $MV_{on}$, time counter 330 is reset to zero. The time counter 330 is incremented for each pulse of the CLK signal.

When the time counter reaches the values for time $t_{az}$ or time $t_{bip}$ stored in compare register 323 for main injection and in compare register 326 for pre-injection, respectively, the level of the MODE signal is changed.

As long as the EIN signal has its higher value and the MODE signal also has its higher value, which is the case during time $t_{az}$, the current through the solenoid valve is regulated to its pickup current value. A suitable value is provided as an ISOLL signal by sequence controller 310 for this purpose.

At the moment $T_{az}$, after the elapse of time $t_{az}$, the MODE signal drops to its lower level. It remains at this level until, after the elapse of time $t_{BIP}$ at the moment $T_{BIP}$, the signal rises to its higher level. The value for the time period $t_{BIP}$ is stored in compare register 322 for the main injection and in compare register 325 for pre-injection. As soon as the time counter has the corresponding counter status, a corresponding level of the MODE signal is set by controller 310.

The time span between moments $T_{bip}$ and $T_{az}$ is normally called the BIP window or free-wheeling phase. The moment when the solenoid valve closes (BIP) is within this window. This BIP window is defined by a high level of the EIN signal and a lower level of the MODE signal. In this time span, the voltage of the solenoid valve is regulated to a value USOLL.

Based on moment $T_{BIP}$ of the previous activation of the solenoid valve, controller 140 calculates the angle value for the $MV_{off}$ signal. This value is stored in the corresponding compare register (305, 306). When the angle counter reaches the corresponding status, a signal is sent from the angle clock to controller 310, and the EIN signal assumes its lower level.

The time period between moment $T_{BIP}$ and moment $MV_{off}$ is called the holding current phase control. This phase is defined by the EIN signal and the MODE signal assuming their higher levels.

At the same time when the $MV_{off}$ signal is emitted, time counter 330 is reset and time period $t_{il}$ is started. This time period $t_{il}$ is stored in compare register 321 and provides the time during which the quick clear of the solenoid valve is active. During this time, the MODE signal is at its lower level, which, together with a lower level of the EIN signal, shows that quick clear is active.

After the elapse of time period $t_{il}$ at the moment $T_{il}$, the MODE signal assumes its high level and the EIN signal its lower level. This signal combination defines a status with no delivery.

This embodiment of the present invention also provides the option of controlling new high-pressure pumps working with regulated constant injection pressure over the duration of the injection. Such systems are normally referred to as "common rail" systems. Since in this case the injected amount is proportional to the injection time, the $MV_{on}$ signal is derived by the angle clock while the $MV_{off}$ signal is generated some programmable time after the $MV_{on}$ edge or after the BIP signal. This signal is provided by time counter 330.

The structure of the injection sequence controller is designed in a similar manner. After the end of the quick clear phase, time counter 330 is reset to zero and remains reset until the next $MV_{on}$ signal. After a power-on reset, time counter 330 remains at zero until angle $MV_{on}$ or $MV_{off}$ is reached.

Figure 6:
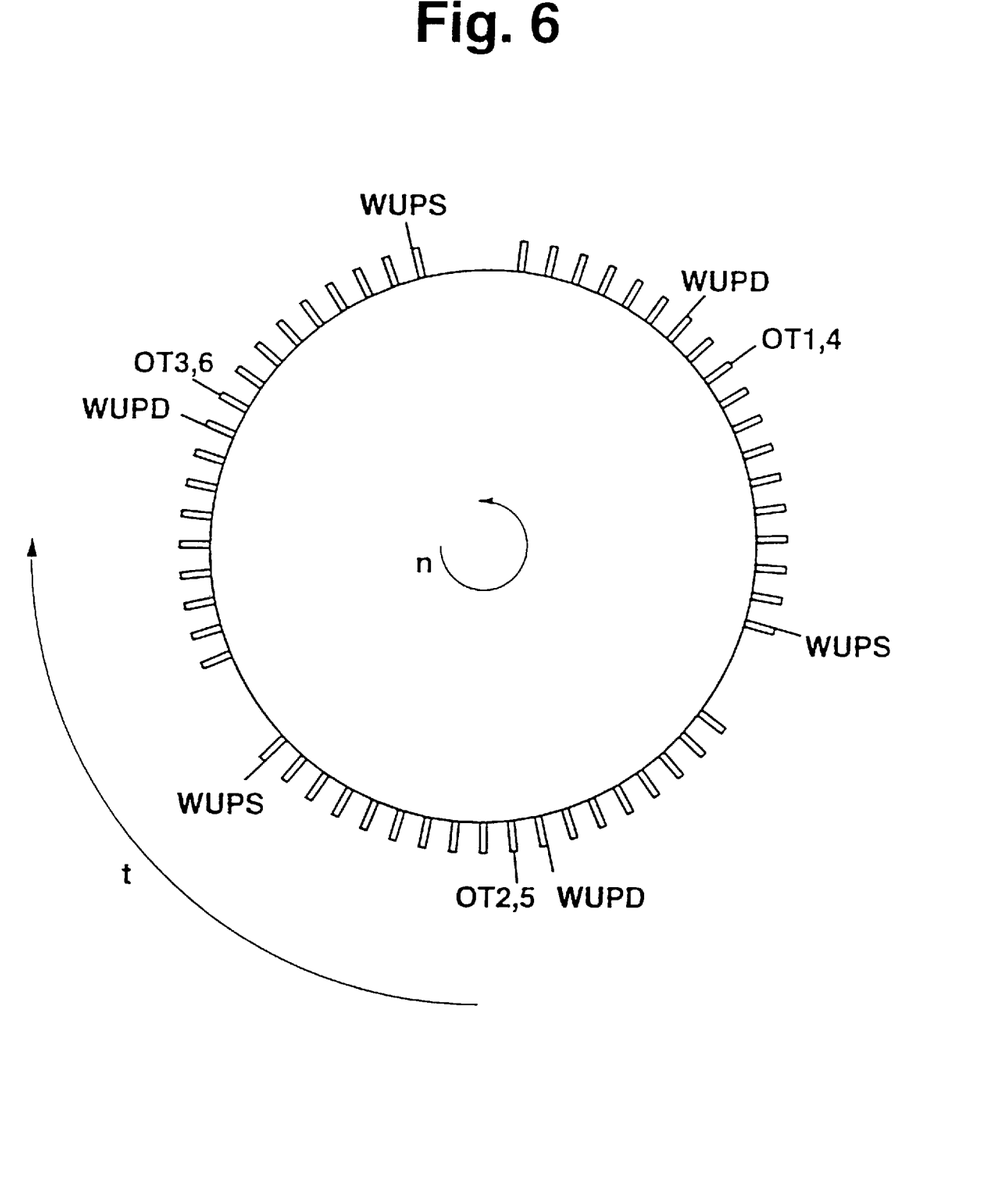
FIG. 6 shows an exemplary design of a timing wheel for detecting the position of a shaft according to the present invention.

FIG. 6 shows the increment wheel using the example of a six-cylinder internal combustion engine. The top dead centers of the individual cylinders are denoted as OT. Since the crankshaft makes two revolutions during one engine revolution, the top dead centers of the first and fourth cylinder, the second and fifth cylinder, and the third and sixth cylinder coincide. The corresponding top dead centers are denoted as OT1,4, OT2,5, and OT3,6.

The static wake-up interrupts are denoted as WUP-S and the dynamic wake-ups interrupts are denoted as WUP-D. They are located a certain number of increments before the top dead center of the respective cylinders.

At a selectable increment, angle clock 230 sends an interrupt signal to controller 140 to input the set values in compare registers 301, 302, 305, and 306. When this interrupt signal WUP-E appears, the controller 140 starts calculating the angles of $MV_{on}$, $MV_{off}$ to control the injection. After calculation, these angles are input in compare register 303 of the angle clock 230. As soon as the angle counter reaches the value stored in compare register 303, an interrupt signal WUP-E is sent to controller 140.

Two different types of interrupts with which angle clock 230 triggers the calculation of the different angle values are distinguished: a static interrupt WUP-S and a dynamic interrupt WUP-D. These signals are used by controller 140 for angle synchronization. The wake-up signal corresponds to an interrupt activating the controller 140 when a certain increment has been reached. Controller 140 previously calculates this increment and writes its value into the gate array of compare register 305. When the controller is thus activated by the gate array, it is advantageous that the controller be freed of superfluous angle information and be only actuated at certain crankshaft positions.

The static wake-up signal WUP-S is generated with a constant angular distance before the respective top dead center of each cylinder. The average speed of the last cylinder segment is obtained from the distance between two wake-up signals. This speed, together with the desired amount, is included in the calculation of the desired angle for delivery start and delivery end. At delivery start, the solenoid valve delay time must be taken into account, since the pump only begins delivering fuel after this time. This BIP time, together with the current average speed, is converted into an angle. Thus the delivery start angle is corrected. The delivery end angle remains uncorrected. The result is the two angles $MV_{on}$ and $MV_{off}$, which denote the beginning and the end of energizing of the solenoid valve.

The static wake-up signal WUP-S represents the beginning of a cylinder segment. With its help, the angle correction value for the BIP time can be changed by changing the speed within the segment of the current cylinder. For this reason, the BIP angle is calculated as closely as possible to the actual $MV_{on}$ angle.

For this purpose, a dynamic wake-up interrupt WUP-D is generated. The angle at which it is generated is calculated with the help of the desired delivery start angle, which was obtained with the help of the average speed at segment start. This is done taking into account the program run times for calculating the angle after wake-up, input of angles $MV_{on}$ and $MV_{off}$ and the maximum possible acceleration. The value of the angle for generating the dynamic wake-up WUP-D is input in the compare structure of the angle clock after calculating at static wake-up.

For the position of the static wake-up, this means that it must be so long before the top dead center that the calculation of the angle for delivery start and delivery time and the dynamic wake-up WUP-D, the input of the angle of dynamic wake-up WUP-D, the time of reaching the dynamic wake-up, the recalculation of the $MV_{on}$ angle, and the input of the $MV_{on}$ and $MV_{off}$ angles in the corresponding compare registers of the angle clock can be processed within the time prior to reaching angle $Mv_{on}$.

The dynamic wake-up interrupt WUP-D causes the controller 140 to calculate the angle $MV_{on}$ based on the instantaneous speed, as closely as possible to the actual $MV_{on}$ angle. After calculating the $MV_{on}$ angle, the angles $MV_{on}$ and $MV_{off}$ are input in the corresponding compare registers.

Based on the different values, the controller 140 determines the angular position of the crankshaft at which it starts the next calculations. It communicates this angular position to the gate array 130. The gate array 130 then sends an interrupt signal to the controller 140 when the angular position has been reached.

We claim:

1. A system for controlling an internal combustion engine and including at least one solenoid valve for determining a fuel delivery start and a fuel deliver end, the system comprising:

at least one first sensor generating first signals and a plurality of incremental pulses, the plurality of incremental pulses including a first incremental pulse and a second incremental pulse, the first and second incremental pulses having a distance therebetween, the first distance being divided into a plurality of partial increments;

at least one second sensor generating second signals;

at least one first device analyzing the first signals;

at least one second device analyzing the second signals;

a first counting device counting the plurality of incremental pulses; and a second counting device counting the plurality of partial increments;

wherein the at least one second device provides an angle value to the at least one first device at preselected times, wherein the at least one first device generates at least one third signal as a function of the angle value and the first signals, and wherein the first and second counting devices are reset to zero when the first counting device reaches a first predetermined value.

2. A system for controlling an internal combustion engine and including at least one solenoid valve for determining a fuel delivery start and a fuel deliver end, the system comprising:

at least one first sensor generating first signals and a plurality of incremental pulses, the plurality of incremental pulses including a first incremental pulse and a second incremental pulse, the first and second incremental pulses having a distance therebetween, the first distance being divided into a plurality of partial increments;

at least one second sensor generating second signals;

at least one first device analyzing the first signals;

at least one second device analyzing the second signals;

a first counting device counting the plurality of incremental pulses; and a second counting device counting the plurality of partial increments;

wherein the at least one second device provides an angle value to the at least one first device at preselected times, wherein the at least one first device generates at least one third signal as a function of the angle value and the first signals, and wherein the at least one first device includes the first and second counting devices, the at least one first device generating the at least one third signal when contents of the first and second counting devices correspond to the angle value.

3. A system for controlling an internal combustion engine and including at least one solenoid valve for determining a fuel delivery start and a fuel deliver end, the system comprising:

at least one first sensor generating first signals and a plurality of incremental pulses, the plurality of incremental pulses including a first incremental pulse and a second incremental pulse, the first and second incremental pulses having a distance therebetween, the first distance being divided into a plurality of partial increments;

at least one second sensor generating second signals;

at least one first device analyzing the first signals;

at least one second device analyzing the second signals;

a first counting device counting the plurality of incremental pulses; and a second counting device counting the plurality of partial increments;

wherein the at least one second device provides an angle value to the at least one first device at preselected times, wherein the at least one first device generates at least one third signal as a function of the angle value and the first signals, and wherein the second counting device is reset to zero when the first counting device is incremented.

4. The system according to claim 3, wherein the at least one first device includes the first counting device, the at least one first device generating the at least one third signal when contents of the first counting device correspond to the angle value.

5. A system for controlling an internal combustion engine and including at least one solenoid valve for determining a fuel delivery start and a fuel deliver end, the system comprising:

at least one first sensor generating first signals and a plurality of incremental pulses, the plurality of incremental pulses including a first incremental pulse and a second incremental pulse, the first and second incremental pulses having a distance therebetween, the first distance being divided into a plurality of partial increments;

at least one second sensor generating second signals;

at least one first device analyzing the first signals;

at least one second device analyzing the second signals;

a first counting device counting the plurality of incremental pulses; and a second counting device counting the plurality of partial increments;

wherein the at least one second device provides an angle value to the at least one first device at preselected times, wherein the at least one first device generates at least one third signal as a function of the angle value and the first signals, and wherein the at least one first device includes the second counting device, the at least one first device generating the at least one third signal when contents of the second counting device correspond to the angle value.

6. The system according to claim 3, wherein the at least one first device generates an interrupt signal when a first counting value of the first counting device corresponds to a second predetermined value.

7. The system according to claims 3, wherein the at least one first device generates a control signal to the at least one solenoid valve when counting values of the first and second counting devices are at least equal to the angle value.

8. The system according to claims 6, wherein the at least one second drive determines the angle value in response to the interrupt signal.

9. The system according to claim 3, wherein the first signals are allowable when a partial increment value of the second counting device is within a preselected valid range.

* * * * *

UNITED STATES PATENT AND TRADEMARK OFFICE
CERTIFICATE OF CORRECTION

PATENT NO. : 5,829,412  
DATED : November 3, 1998  
INVENTOR(S) : Klatt et al.

Page 1 of 1

It is certified that error appears in the above-identified patent and that said Letters Patent is hereby corrected as shown below:

Column 11,
Delete lines 61-63 and insert -- first signals, and wherein the second counting device is reset to zero when the first counting device is incremented. --

Column 12,
Delete lines 48-50 and insert -- first signals, and wherein the first and second counting devices are reset to zero when the first counting device reaches a first predetermined value. --

Signed and Sealed this

Twenty-first Day of August, 2001

Attest:

*Nicholas P. Godici*

NICHOLAS P. GODICI
*Attesting Officer*   *Acting Director of the United States Patent and Trademark Office*